United States Patent
Perlman

(10) Patent No.: US 7,493,078 B2
(45) Date of Patent: Feb. 17, 2009

(54) ANTENNA ASSEMBLY FOR SATELLITE AND WIRELESS SERVICES

(75) Inventor: Stephen G. Perlman, Palo Alto, CA (US)

(73) Assignee: OnLive, Inc., Palo Alto, CA (US)

( * ) Notice: Subject to any disclaimer, the term of this patent is extended or adjusted under 35 U.S.C. 154(b) by 29 days.

(21) Appl. No.: 10/315,694

(22) Filed: Dec. 10, 2002

(65) Prior Publication Data

US 2004/0110463 A1 Jun. 10, 2004

(51) Int. Cl.
*H04H 20/71* (2008.01)
*H04H 40/00* (2008.01)
*H04B 7/185* (2006.01)

(52) U.S. Cl. .............. 455/3.01; 455/12.1; 455/427; 455/306

(58) Field of Classification Search .......... 455/3.02, 455/3.04, 12.1, 513, 428, 429, 450, 427, 455/430, 13.1, 3.01, 3.06
See application file for complete search history.

(56) References Cited

U.S. PATENT DOCUMENTS

| | | | |
|---|---|---|---|
| 4,539,706 A | 9/1985 | Mears et al. | |
| 5,058,199 A | 10/1991 | Grube | |
| 5,129,096 A | 7/1992 | Burns | |
| 5,222,246 A * | 6/1993 | Wolkstein | 455/13.4 |
| 5,408,679 A | 4/1995 | Masuda | |
| 5,509,028 A | 4/1996 | Marque-Pucheu | |
| 5,574,979 A | 11/1996 | West | |
| 5,608,412 A * | 3/1997 | Welles et al. | 342/457 |
| 5,640,386 A | 6/1997 | Wiedeman | |
| 5,654,747 A | 8/1997 | Ottesen et al. | |
| 5,732,076 A | 3/1998 | Ketseoglou et al. | |
| 5,742,680 A | 4/1998 | Wilson | |
| 5,815,146 A | 9/1998 | Youden et al. | |
| 5,870,428 A | 2/1999 | Barrett et al. | |
| 5,870,665 A | 2/1999 | Uchikawa | |
| 5,890,055 A | 3/1999 | Chu et al. | |
| 5,915,020 A * | 6/1999 | Tilford et al. | 455/3.02 |
| 5,959,592 A | 9/1999 | Petruzzelli | |
| 6,009,060 A | 12/1999 | Kim | |
| 6,092,117 A | 7/2000 | Gladwin et al. | |
| 6,132,306 A | 10/2000 | Trompower | |
| 6,148,142 A | 11/2000 | Anderson | |

(Continued)

FOREIGN PATENT DOCUMENTS

EP 1 094 642 A2 4/2001

(Continued)

OTHER PUBLICATIONS

Jack Boulware, "Power Houses", Wired Nov. 2002, Issue 10.11, (electronic copy, 11 pages), Wired Digital, Inc., US.

*Primary Examiner*—Tilahun B Gesesse
(74) *Attorney, Agent, or Firm*—The Law Offices of Bradley J. Bereznak

(57) ABSTRACT

An antenna assembly includes a reflector dish and a unit attached at a distal end of an arm to receive satellite signals reflected from the reflector dish. The unit includes at least one low-noise block converter (LNB) to receive the satellite signals and a wireless communication transceiver that operates to transmit and receive video and data information within a surrounding range.

48 Claims, 6 Drawing Sheets

U.S. PATENT DOCUMENTS

| | | | |
|---|---|---|---|
| 6,160,993 A * | 12/2000 | Wilson | 455/12.1 |
| 6,166,703 A * | 12/2000 | Muterspaugh | 343/840 |
| 6,188,571 B1 | 2/2001 | Roganti et al. | |
| 6,205,185 B1 * | 3/2001 | Kajiwara | 375/316 |
| 6,263,503 B1 | 7/2001 | Margulis | |
| 6,323,909 B1 | 11/2001 | Michener et al. | |
| 6,334,045 B1 * | 12/2001 | Green et al. | 455/3.02 |
| 6,347,216 B1 | 2/2002 | Marko | |
| 6,397,038 B1 | 5/2002 | Green et al. | |
| 6,404,775 B1 | 6/2002 | Leslie et al. | |
| 6,412,112 B1 | 6/2002 | Barrett et al. | |
| 6,424,817 B1 * | 7/2002 | Hadden et al. | 455/3.02 |
| 6,430,233 B1 * | 8/2002 | Dillon et al. | 375/316 |
| 6,473,858 B1 | 10/2002 | Shimomura et al. | |
| 6,584,080 B1 | 6/2003 | Ganz et al. | |
| 6,597,891 B2 | 7/2003 | Tantawy et al. | |
| 6,600,730 B1 * | 7/2003 | Davis et al. | 370/343 |
| 6,614,768 B1 | 9/2003 | Mahany et al. | |
| 6,650,869 B2 * | 11/2003 | Kelly et al. | 455/13.2 |
| 6,671,186 B2 | 12/2003 | Kopf | |
| 6,684,058 B1 | 1/2004 | Karacaoglu et al. | |
| 6,690,657 B1 | 2/2004 | Lau et al. | |
| 6,690,926 B2 | 2/2004 | Tawil et al. | |
| 6,728,541 B2 | 4/2004 | Ohkura et al. | |
| 6,741,841 B1 | 5/2004 | Mitchell | |
| 6,745,050 B1 | 6/2004 | Forsythe et al. | |
| 6,757,913 B2 | 6/2004 | Knox | |
| 6,788,882 B1 | 9/2004 | Geer et al. | |
| 6,811,113 B1 * | 11/2004 | Silansky et al. | 244/30 |
| 6,832,071 B1 | 12/2004 | Nakamura et al. | |
| 6,836,658 B1 | 12/2004 | Sharon et al. | |
| 6,842,617 B2 | 1/2005 | Williams | |
| 6,845,090 B1 | 1/2005 | Takabatake et al. | |
| 6,847,625 B2 | 1/2005 | Heinonen et al. | |
| 6,850,285 B2 | 2/2005 | Eaton et al. | |
| 6,853,197 B1 | 2/2005 | McFarland et al. | |
| 6,856,786 B2 | 2/2005 | Belostotsky et al. | |
| 6,886,029 B1 | 4/2005 | Pecus et al. | |
| 6,925,285 B2 * | 8/2005 | Kim | 455/3.02 |
| 6,968,153 B1 | 11/2005 | Heinonen et al. | |
| 7,072,627 B2 * | 7/2006 | Coffin, III | 455/137 |
| 7,215,660 B2 | 5/2007 | Perlman | |
| 7,239,698 B2 * | 7/2007 | Phillips et al. | 379/413.03 |
| 7,289,478 B1 | 10/2007 | Kim et al. | |
| 2002/0028655 A1 | 3/2002 | Rosener et al. | |
| 2002/0038459 A1 * | 3/2002 | Talmola et al. | 725/81 |
| 2002/0046285 A1 | 4/2002 | Yasushi et al. | |
| 2002/0059614 A1 | 5/2002 | Lipsanen et al. | |
| 2002/0061743 A1 | 5/2002 | Hutcheson et al. | |
| 2002/0068592 A1 | 6/2002 | Hutcheson et al. | |
| 2002/0071658 A1 | 6/2002 | Marko et al. | |
| 2002/0072329 A1 | 6/2002 | Bandeira et al. | |
| 2002/0106119 A1 | 8/2002 | Foran et al. | |
| 2002/0115409 A1 | 8/2002 | Khayarallah | |
| 2002/0152303 A1 * | 10/2002 | Dispensa | 709/224 |
| 2002/0154055 A1 | 10/2002 | Davis | |
| 2002/0181189 A1 | 12/2002 | Yang et al. | |
| 2002/0188955 A1 | 12/2002 | Thompson et al. | |
| 2003/0054827 A1 * | 3/2003 | Schmidl et al. | 455/450 |
| 2003/0079016 A1 | 4/2003 | Tsao et al. | |
| 2003/0124977 A1 | 7/2003 | Smith et al. | |
| 2003/0139150 A1 * | 7/2003 | Rodriguez et al. | 455/90 |
| 2003/0181162 A1 | 9/2003 | Matula | |
| 2003/0181229 A1 * | 9/2003 | Forster et al. | 455/575.7 |
| 2003/0199247 A1 | 10/2003 | Striemer | |
| 2003/0207684 A1 * | 11/2003 | Wesel | 455/427 |
| 2003/0216144 A1 | 11/2003 | Roese et al. | |
| 2003/0220072 A1 * | 11/2003 | Coffin, IIII | 455/3.02 |
| 2003/0231774 A1 | 12/2003 | Schildbach et al. | |
| 2003/0234804 A1 | 12/2003 | Parker et al. | |
| 2004/0034865 A1 | 2/2004 | Barrett et al. | |
| 2004/0094194 A1 | 5/2004 | Aldoretta et al. | |
| 2004/0110469 A1 | 6/2004 | Judd et al. | |
| 2004/0121648 A1 | 6/2004 | Voros | |
| 2004/0125820 A1 | 7/2004 | Rios | |
| 2004/0203694 A1 | 10/2004 | Wong et al. | |
| 2004/0204102 A1 * | 10/2004 | Kuehnel et al. | 455/562.1 |
| 2005/0286448 A1 | 12/2005 | Proctor | |
| 2006/0098592 A1 | 5/2006 | Proctor, Jr. et al. | |
| 2006/0183421 A1 | 8/2006 | Proctor et al. | |

FOREIGN PATENT DOCUMENTS

| | | |
|---|---|---|
| EP | 1202472 | 5/2002 |
| JP | 2001111575 | 4/2001 |
| JP | 2001244864 | 9/2001 |
| WO | 00/04840 | 8/2000 |
| WO | WO 02/078369 A | 10/2002 |
| WO | WO 30032666 | 4/2003 |

* cited by examiner

ANTENNA ASSEMBLY FOR SATELLITE AND WIRELESS SERVICES

RELATED APPLICATIONS

This application is related to co-pending applications Ser. No. 10/315,788, filed Dec. 10, 2002, entitled, "MASS STORAGE REPOSITORY FOR A WIRELESS NETWORK"; Ser. No. 10/315,460, filed Dec. 10, 2002, entitled, "APPARATUS AND METHOD FOR WIRELESS VIDEO GAMING"; and Ser. No. 10/315,624, filed Dec. 10, 2002, entitled, "WIRELESS NETWORK PROVIDING DISTRIBUTED VIDEO/DATA SERVICES"; each of which is assigned to the assignee of the present application.

FIELD OF THE INVENTION

The present invention relates generally to the field of transmission of digital data; more specifically, to satellite communication systems and networks for distributing video data and for providing interactive services to geographically dispersed clients.

BACKGROUND OF THE INVENTION

Satellite communications systems have been widely deployed over the past several decades. By way of example, Direct Broadcast Satellite (DBS) services have increasingly expanded to provide a variety of video program services directly to people's homes, apartments, and offices. In a conventional direct-to-home (DTH) satellite communication system, one or more telecommunications satellites in geosynchronous orbit receive media content from a broadcast "uplink" center. The satellite then radiates microwave signal beams to send the media content across a geographical region of the planet. For example, in the case of satellite service providers like DirectTV® video programs are broadcast across a wide region of the continental United States from several satellites in geosynchronous orbit above the Earth's equator.

Subscriber homes in the U.S. typically utilize an outdoor antenna dish mounted to their roof or an exterior wall to receive the satellite-transmitted signals. A satellite receiver or set-top box within the home is connected to the antenna for acquiring the satellite carrier signal and displaying the video program content received from the satellite transmission. As is well known, the satellite receiver may include decompression, decryption, decoder, demodulation and other circuitry for converting the received signals into a format (e.g., high definition television (HDTV), standard definition television (SDTV), etc.) suitable for viewing on a display device by the subscriber. For example, for direct-to-home digital satellite carriers which conform to Digital Video Broadcast (DVB) standards, the satellite receiver is configured to receive a set of parameters that may include the polarization, symbol rate, forward error correcting (FEC) rate and frequency to acquire the satellite digital carrier. U.S. Pat. Nos. 6,473,858, 6,430,233, 6,412,112, 6,323,909, 6,205,185, and 5,742,680 describe various conventional satellite communication systems that operate in this manner.

Satellite transmissions are often grouped in channel sets, wherein each channel set spans a certain transmit band. The channel sets are typically isolated by different electromagnetic polarizations. For instance, channel sets may be transmitted with linear polarization (i.e., horizontal or vertical) or circular polarization (i.e., left-hand or right-hand). These channel sets are detected on a polarization-sensitive antenna assembly through a low-noise block converter (LNB) mounted opposite a parabolic antenna dish. The LNB may be configured, for example, to detect the horizontal or vertical polarized signals reflected from the antenna dish. The LNB connects to the satellite receiver unit or set-top box located inside the subscriber's home via a coaxial cable.

In some receiving systems two LNBs are provided to receive both channel sets so that multiple television sets within a home may view different program channels simultaneously. Examples of different satellite data receiving systems are found in U.S. Pat. Nos. 6,424,817 and 5,959,592.

One of the problems with satellite communication systems is that they generally require an unobstructed line-of-sight between the orbiting satellite and the receiving antenna dish. In the United States, for instance, satellites typically orbit above the equator and are therefore "seen" by the antenna above the southern horizon. A home in a densely populated metropolitan region, however, may have its view of the southern sky obstructed by a tall building. In other cases, apartment dwellers living in units on the north side of a building may be precluded from mounting an antenna anywhere to receive satellite transmissions from a satellite orbiting above the southern horizon.

In other cases, landlords who own apartment buildings containing multiple units may be reluctant to permit tenants to mount multiple antenna dishes on their structure or route cable wires through the exterior and interior of the building. Routing of wires is also a problem in homes, particularly when multiple televisions are to receive programming services. The line-of-sight requirement and the problem of multi-dwelling units (MDUs) have therefore limited the number of homes that can receive digital services from satellite vendors.

An additional problem that satellite vendors generally face is the difficulty of providing interactive data services to their customers. Some specialized satellite service providers offer two-way data services, but these systems require the subscriber to purchase a fairly large antenna dish (e.g., 3-5 feet wide) with increased power demands for uplink transmission to the satellite. Another drawback is the inherent latency associated with signal transmission from Earth to the orbiting satellite, and then back down to Earth. This latency can produce sluggish system performance as compared to terrestrial cable systems, for example, when the user wants to access a web page containing large amounts of content and data.

Thus, there is a pressing need for new apparatus and methods for distributing satellite services and video content to the general population on an expanded basis. There is also a need for a communication network that provides additional services, such as interactive data services, to subscribers at a competitive cost and at a high performance level.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

The present invention is a pioneering advancement in the field of multimedia communication systems. By integrating a wireless transceiver into a satellite antenna assembly, the present invention provides, for the first time, a wireless local area network (WLAN) which both distributes a wide range of video services (digitally-encoded broadcast services, pay-per-view television, and on-demand video services, etc.) and provides two-way (i.e., interactive) data services to individuals located across a wireless coverage region.

In the following description numerous specific details are set forth, such as frequencies, circuits, configurations, etc., in order to provide a thorough understanding of the present invention. However, persons having ordinary skill in the satellite and communication arts will appreciate that these specific details may not be needed to practice the present invention. It should also be understood that the basic architecture and concepts disclosed can be extended to a variety of different implementations and applications. Therefore, the following description should not be considered as limiting the scope of the invention.

Figure 1:
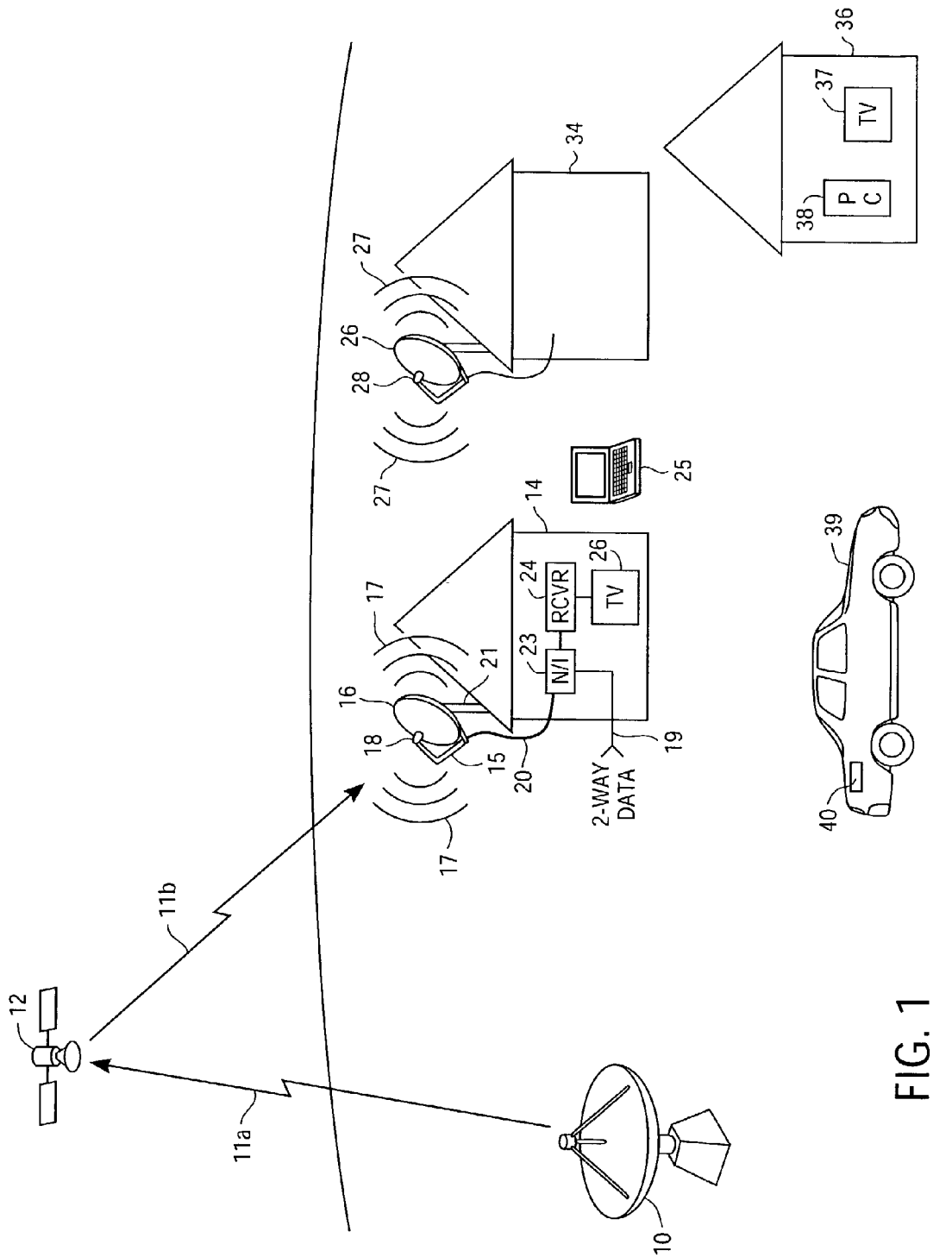
FIG. 1 is a conceptual diagram of a satellite communication system in accordance with one embodiment of the present invention.

With reference to FIG. 1, a conceptual diagram of a satellite communication system in accordance with the present invention is shown comprising a telecommunications satellite 12 positioned in a fixed, geosynchronous orbital location in the sky over the particular geographical region of the Earth. Satellite 12 utilizes standard solar panels to generate power for the satellite's resources which includes one or more transponders that provide telecommunication links (i.e., "uplinks" and "downlinks") to Earth-based stations and receivers.

Figure 2:
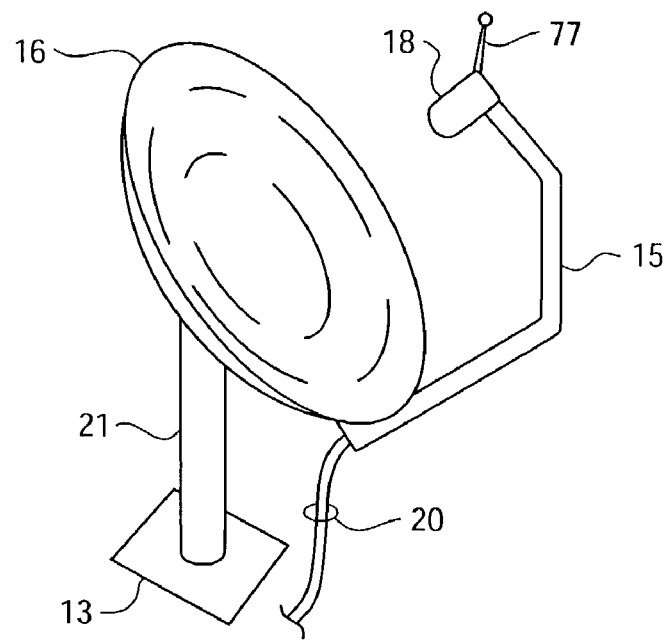
FIG. 2 is a perspective view of an antenna assembly according to one embodiment of the present invention.

For example, FIG. 1 shows a large antenna 10 that broadcasts video programs from an uplink center to satellite 12. This uplink signal is represented by arrow 11*a*. Satellite 12 transmits the broadcast signal (e.g., downlink 11*b*) across a coverage region of the Earth, where it may be received at a home 14 equipped with an outdoor antenna assembly coupled to electronics for displaying the video programs. The antenna assembly, which is also shown in FIG. 2, includes a support 21 attached to a parabolic or concave reflector dish 16, which is aimed to the location in the sky where satellite 12 is positioned in geosynchronous orbit above the earth. Support 21 may include a base plate 13 to facilitate mounting of the antenna assembly to the exterior (e.g., roof) of house 14. An arm 15, attached to either dish 16 or support 21, extends to position a signal unit 18 at a focal point of the reflector dish 16. An antenna 77 for wireless transmissions is also shown attached to unit 18. Unit 18 converts the electromagnetic radiation reflected from dish 16 into electrical signals carried by one or more conductors 20 to a network interface unit 23 or satellite receiver 24 within home 14. Receiver 24, for example, converts the satellite transmission signals into a format for display on television 26.

Figure 3:
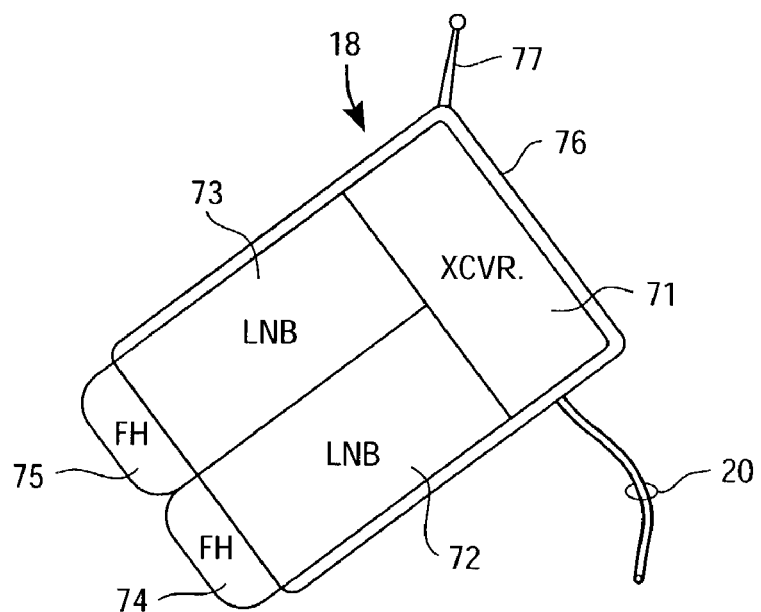
FIG. 3 is a more detailed view of the components comprising the signal unit of the antenna assembly shown in FIG. 2.

With reference to FIG. 3, there is shown an exemplary embodiment of signal unit 18 in accordance with the present invention comprising a pair of low-noise block converters (LNBs) 72 & 73 and a wireless transceiver 71 mounted in a case or housing 76. Wireless transceiver 71 has an associated antenna 77 to effectuate wireless transmissions. Feed horns 74 and 75 associated with LNBs 72 & 73, respectively, protrude from a side of housing 76 that is positioned nearest to reflector dish 16. Alternatively, the signal unit 18 may utilize a single feed horn coupled to one or more LNBs. Other embodiments may include multiple transceivers, each having its own associated wireless antenna. For instance, an alternative embodiment may comprise a pair of LNBs with an associated pair of wireless transceivers, each having its own wireless antenna.

In this example, LNBs 72 & 73 may be configured to receive horizontally and vertically polarized satellite transmission signals. Cable 20 connects with the LNBs and transceiver 71. (It should be understood that within the context of this disclosure, the term "cable" is used to refer to one or more wires, and that such wires may comprise coaxial wires of a type known as RG-6, or a similar type.)

It is appreciated that in other embodiments unit 18 may comprise a single LNB and a wireless transceiver. In still other embodiments, unit 18 may include four or more LNBs and one or more wireless transceivers mounted together.

According to one embodiment of the present invention, wireless transceiver 71 operates in compliance with IEEE specification 802.11a, 802.11b, 802.11g, etc., to provide high-speed networking and communication capability to computers, televisions, and other devices compatibly equipped to receive such wireless signals. Other embodiments may operate in compliance with variant specifications that are compatible with IEEE specification 802.11a, 802.11b, or 802.11g, and which provide for wireless transmissions at high-bandwidth video data rates (e.g., about 2 Mbps or greater). For the purposes of the present application, IEEE specification 802.11a, 802.11b, 802.11g, and Industrial, Scientific, and Medical (ISM) band networking protocols are denoted as "802.11x". Other non-ISM bands wireless network protocols could be utilized as well. Transceiver 71 facilitates network connectivity to users located within a surrounding range, allowing them to receive satellite broadcast programs, pay-per-view services, on-demand video, Internet access, and other interactive data services, thus obviating the need for a wired connection to individual users.

In the example of FIG. 1, transceiver 71 operates over the license-free 5 GHz band (e.g., 5725 MHz to 5850 MHz) to provide upwards of 54 Mbps of bandwidth in good transmission conditions. IEEE specification 802.11a allows for a high-speed wireless transmission of raw data at indoor distances of up to several hundred feet and outdoor distances of up to ten miles, depending on impediments, materials, and line-of-sight. 802.11a has twelve channels (eight in the low part of the band for indoor use and four in the upper for outdoor use) which do not overlap, allowing for dense installations. According to the present invention, individual users may receive transmissions from transceiver 71 using hardware equipment available from a number of vendors. For example, Proxim, Inc. manufactures and sells the Harmony 802.11a PCI card that provides wireless broadband networking at a data rate of 54 Mbps.

In another embodiment, transceiver 71 operates in compliance with IEEE specification 802.11g over the license-free 2.46 GHz band.

As shown in FIG. 1, wireless signals 17 may be transmitted from unit 18 of the antenna assembly mounted on house 14 to a nearby laptop computer 25 installed with a PC card or a PCI card that is 802.11x compliant. Similar equipment may be installed into slots of a personal computer 38 or a television 37 to provide connectivity to network services in a house 36 that is located within the neighboring range of the wireless transceiver, despite the fact that house 36 does not have a satellite antenna dish or is not otherwise wired to receive such services. This means, for example, that someone may access their electronic mail from any location within the full extent of the wireless network since the transmission signals pass easily through walls and glass.

In the example of FIG. 1, house 36 may be located outside of the signal range of wireless transmission signals 17, but within the range of the wireless signals 27 from the transceiver mounted in unit 28 of antenna assembly 26 on top of a neighboring house 34. In such a case, the transceiver within unit 28 may function as a repeater or hub for house-to-house transmissions; that is, to relay the media content and interactive services provided at home 14 to users at home 36 and elsewhere. Through the use of transceivers 71 functioning as repeaters, content and two-way data services may be distributed to end users located at considerable distances from the original service connection source. In other words, a neighborhood of antenna assemblies that include wireless transceivers can be used to create a network that provides distributed video program and interactive data connectivity. Homes installed with an antenna assembly according to the present invention may still act as a house-to-house repeater for the neighborhood as part of a "roof-hopping" scheme, even though they may not have an immediate need for wireless communications, Later on, those homes may simply add the appropriate hardware (e.g., wireless communication card, network interface box, etc.) to take advantage of the additional services such as interactive data provided by wireless connectivity.

Figure 8:
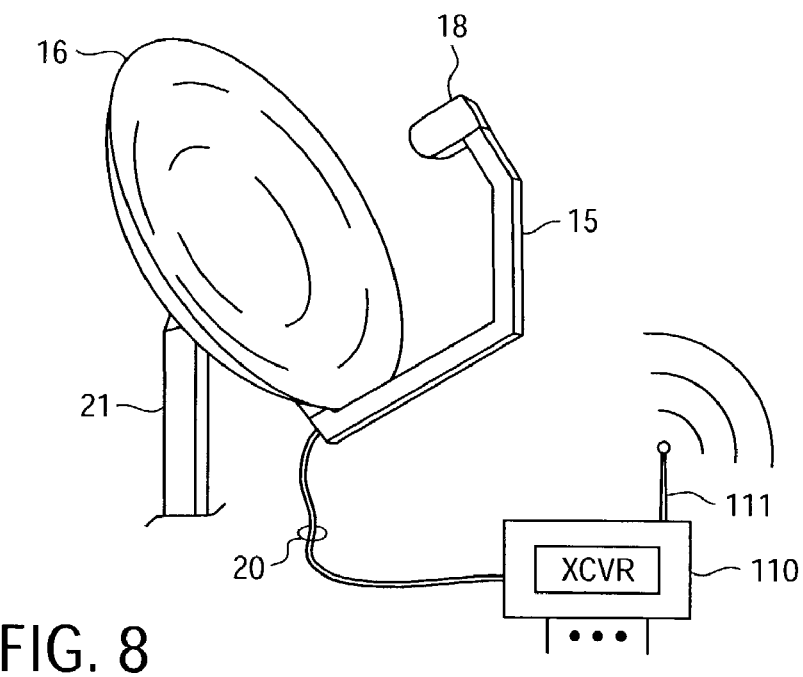
FIG. 8 shows an alternative embodiment of the present invention, wherein a wireless transceiver is incorporated in a distribution box.

It is appreciated that wireless transceiver 71 need not be physically located on or inside of signal unit 18. In FIG. 8, for example, a wireless transceiver connected to wireless antenna 111 is incorporated into a distribution box 110. Distribution box 110 may splice into cable 20 at any point, and therefore may be remotely located some distance from the antenna assembly comprising reflector 16, arm 15, and signal unit 18. In addition to providing a point for wireless transmissions, distribution box 110 may also function as a splitter or switching device for the signals carried on cable 20.

It should be further understood that according to the present invention, the individual satellite antenna assemblies need not be located on homes or other buildings; instead, they may be positioned on existing telephone poles, or mounted on other structures with dedicated, stand-alone hardware. Additionally, a plurality of stand-alone wireless transceivers that function solely as signal repeaters may be distributed in a geographic region or throughout a large building wherever power is available to provide network connectivity that extends throughout the region or area.

Figure 9:
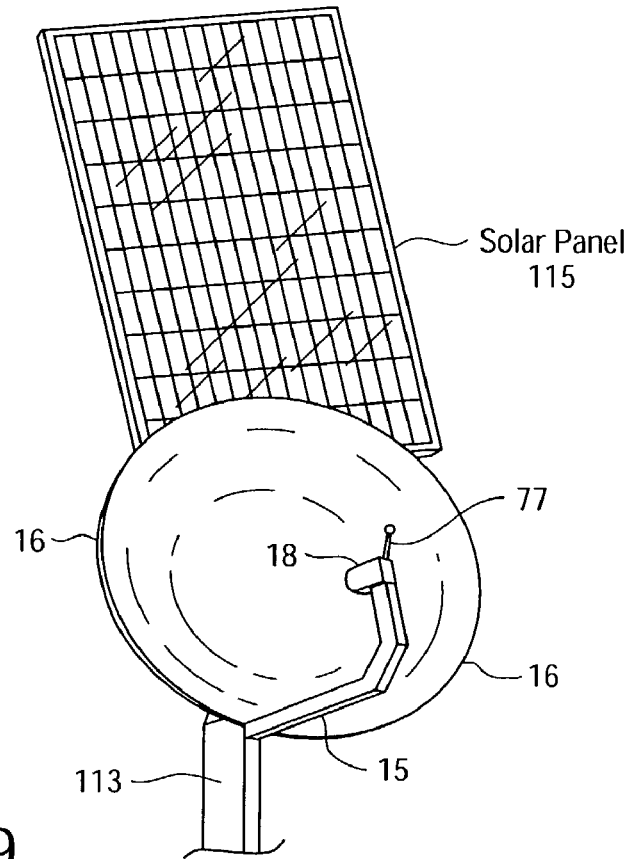
FIG. 9 shows an example of a wireless transceiver functioning as a free-standing repeater in accordance with an embodiment of the present invention.

For example, FIG. 9 shows a free-standing antenna assembly according to one embodiment of the present invention. The antenna assembly, which includes a signal unit 18 with wireless antenna 77 positioned at the distal end of arm 15 opposite reflector 16, is mounted on a pole 113 along with an associated solar cell panel 115. Solar cell panel 115 provides power to support the 802.11x wireless transceiver operating as a repeater on an around-the-clock basis. Solar cell panel 115 may be dimensioned sufficiently large enough, and may be coupled to a storage cell battery (not shown) mounted on the pole or in back of the panel so as to provide power "24×7" to the antenna assembly based on minimum daily solar radiation averages for the particular geographic location.

Figure 4:
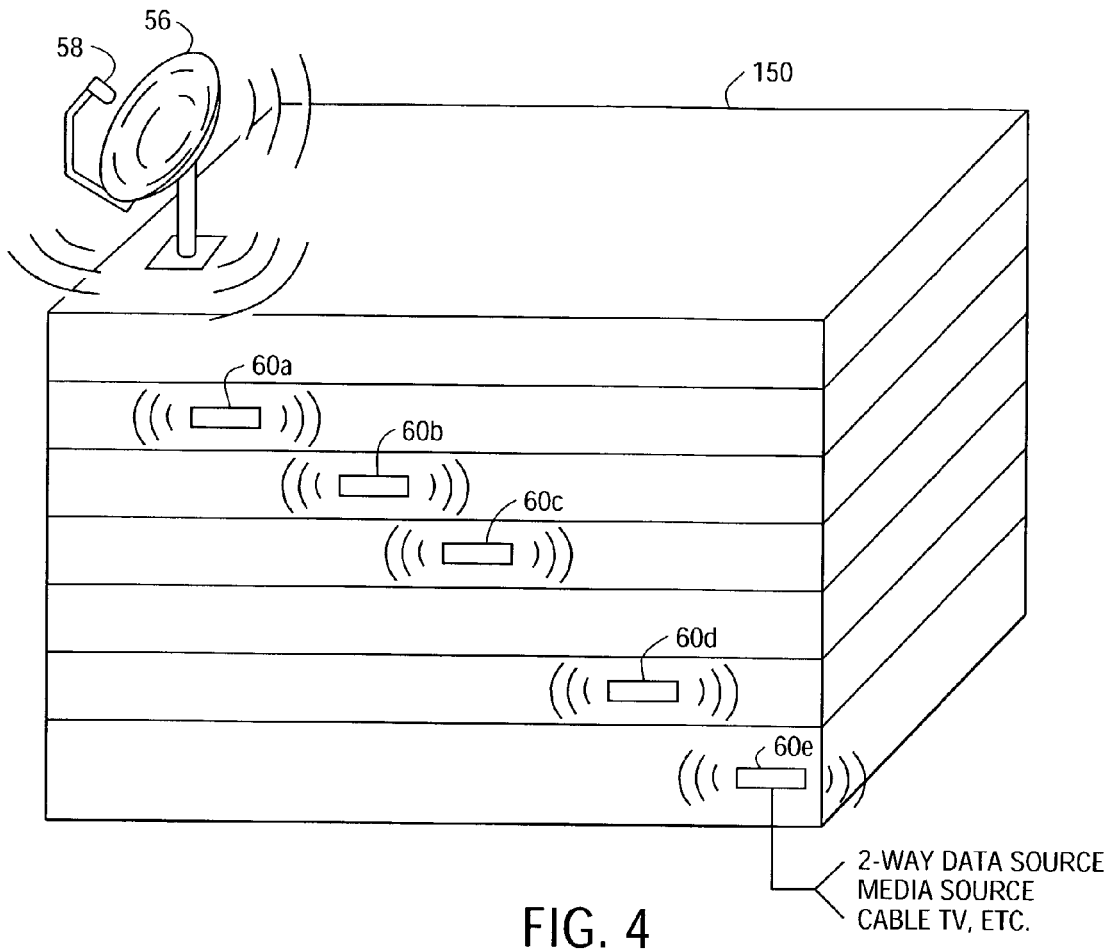
FIG. 4 is an example showing an application of the present invention to a multi-dwelling unit.

FIG. 4 shows a large apartment building 50 with a satellite antenna assembly that includes a reflector dish 56 and a wireless transceiver mounted in signal unit 58. (The electronics that provides power and command/control signals for the antenna assembly is not shown in FIG. 4 for clarity reasons.) A series of repeaters 60a-60e are located on various floors throughout the building to distribute signal transmissions to/from the transceiver of unit 58 to each of the multiple apartment units within building 50. A two-way data service connection (e.g., DSL) is provided to an 802.11x wireless transceiver/repeater 60e. Thus, subscribers located anywhere within building 50 may connect to the DSL service via this wireless transmission. Similarly, two-way data service connectivity is provided to others within the range of the transceiver of unit 58 of the antenna assembly mounted on the roof of building 50 (or to anyone in a neighboring region reached via roof-hopping signal repeating). In a metropolitan region a single satellite antenna assembly with integrated wireless transceiver can therefore distribute high bandwidth services to residents of neighboring buildings, even though those neighboring buildings may not have a satellite antenna or be otherwise wired to receive those services.

Additionally, wireless transceiver/repeater 60e may be connected to receive video content from some media source, e.g., a Digital Versatile Disk ("DVD") player, or cable television programming. In the later case, for instance, wireless transceiver/repeater 60e may include a cable modem equipped with an 802.11x transmitter. These alternative or additional services may then be distributed in a similar manner described above.

FIG. 1 also illustrates another extension of the network provided by the present invention, wherein media content may be distributed to an 802.11x compliant receiver unit 40 installed in the trunk of an automobile 39, or other mobile vehicle. Unit 40, for instance, may include a hard disk drive to store video programs received from wireless transmission signals 17 when automobile 40 is parked, say, overnight in a garage. These programs can then be viewed by rear-seat passengers on a trip the following day.

With continued reference to the example of FIG. 1, two-way data service is shown being provided by cable 19 connected to a network interface unit 23. Cable 19 may provide a direct subscriber line (DSL) connection, for instance, which may then be distributed to subscribers in the surrounding range of wireless signals 17. Thus, according to the present invention a user of laptop computer 25, who may be located outdoors or at a nearby cafe, can access the Internet, watch a pay-per-view film, or receive a multitude of other multimedia services.

Alternatively, network interface unit 23 may be connected to a cable broadcast service provider (e.g., cable television) through an Ethernet or Universal Serial Bus (USB), or similar connection, thereby enabling wireless access of those cable services to subscribers within the range of the wireless network. This means that a subscriber may watch their favorite television program or a pay-per-view movie from a laptop computer or television while outdoors, in a cafe, or in some other building, within the wireless coverage region without the need for a direct-wired cable connection. Distribution of cable services may be implemented with a cable modem device that includes an 802.11x transmitter. It is appreciated that additional circuitry for encrypting the video and data information may also be included to thwart pirates and interlopers.

Figure 5:
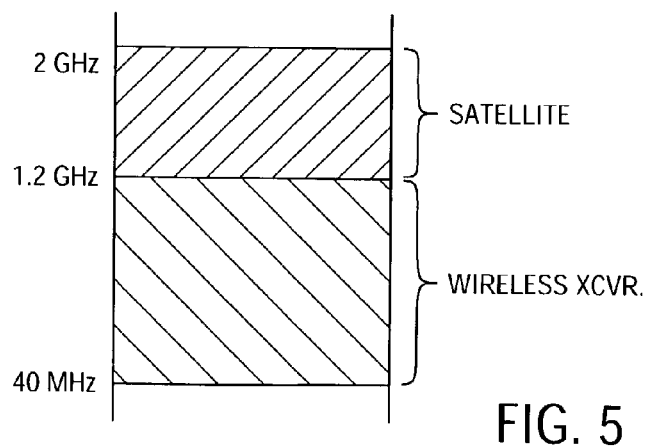
FIG. 5 illustrates the spectrum band utilized for cable communications with the wireless transceiver in accordance with one embodiment of the present invention.
Figure 6:
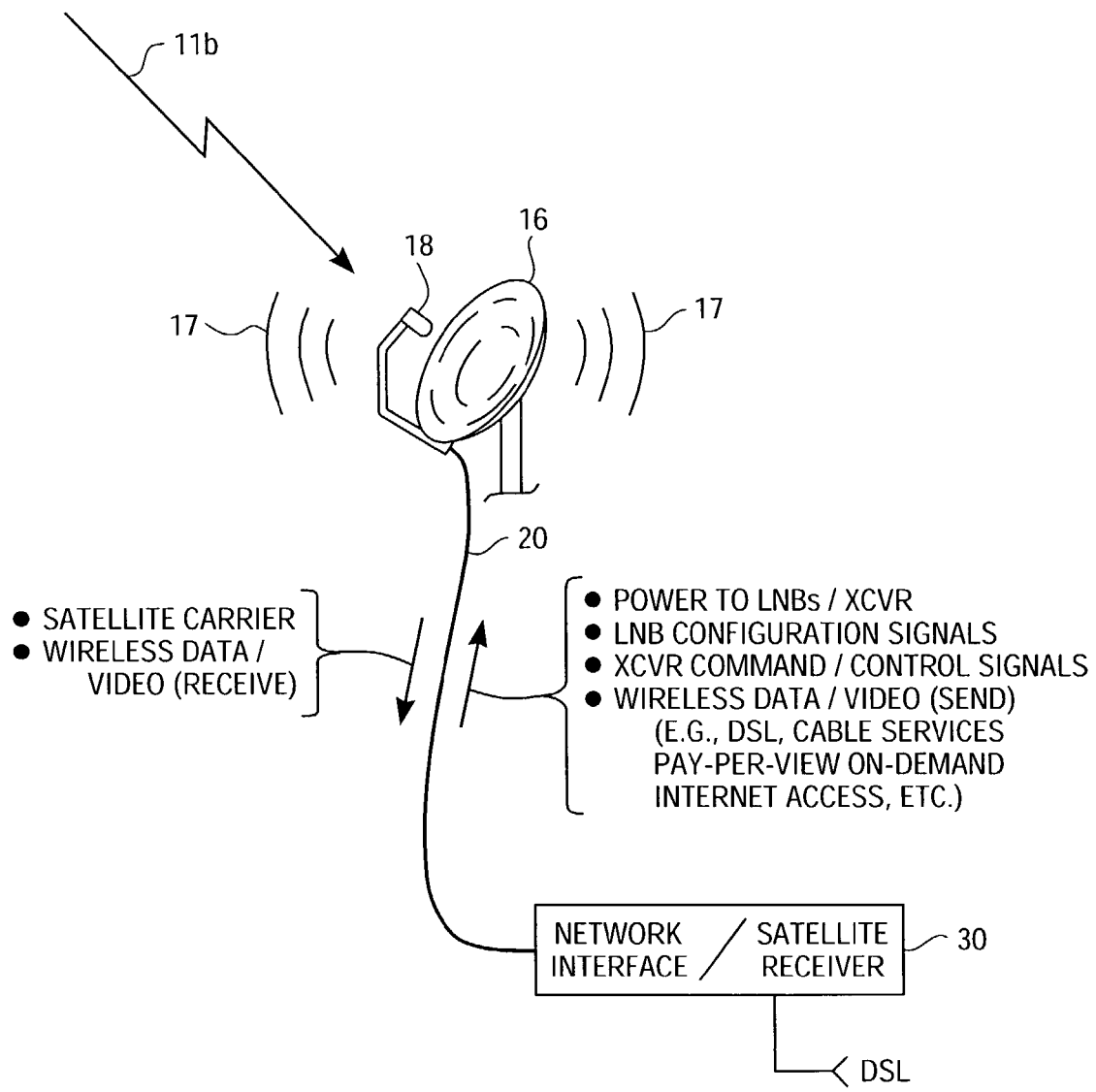
FIG. 6 depicts the type of information and signals transmitted between the network interface/satellite receiver device and antenna assembly according to one embodiment of the present invention.

Network interface unit 23 provides power to and communicates with transceiver 71 of unit 18 via cable 20. Although the embodiment of FIG. 1 shows network interface unit 23 connected to satellite receiver 24, alternatively both devices may be integrated in to a single device 30, as shown in FIG. 6. In either case, the network interface unit communicates with the transceiver using spectrum that is not otherwise utilized in cable 20. Since satellite receivers tend to operate in the spectrum from about 1.2 GHz to about 2 GHz, the spectrum below 1.2 GHz, down to about 40 MHz, may be used for communications with the wireless transceiver. This spectrum band is illustrated in FIG. 5.

It should also be understood that although FIG. 1 shows a direct connection between satellite receiver 24 and television 26, alternatively, video services may be provided to any 802.11x compliant television (e.g., installed with an 802.11x adapter card) located within the house or surrounding wireless coverage region.

FIG. 6 depicts the type of information and signals carried by cable 20 between network interface/satellite receiver device 30 and unit 18 of the antenna assembly of the present invention. Many techniques are well known in the electronics and communications arts for transmitting such signals, such as QPSK and QAM modulation. As shown, satellite signals received by the antenna assembly are provided to device 30 via cable 20. Additionally, wireless transmissions received by transceiver 71 are coupled to device 30. Device 30 provides power to the LNBs and transceiver, LNB configurations signals, transceiver command and control signals, and wireless data via cable 20. By way of example, FIG. 6 shows device 30 having a DSL connection that may provide Internet access to users within the surrounding range of the transceiver of unit 18.

Figure 7:
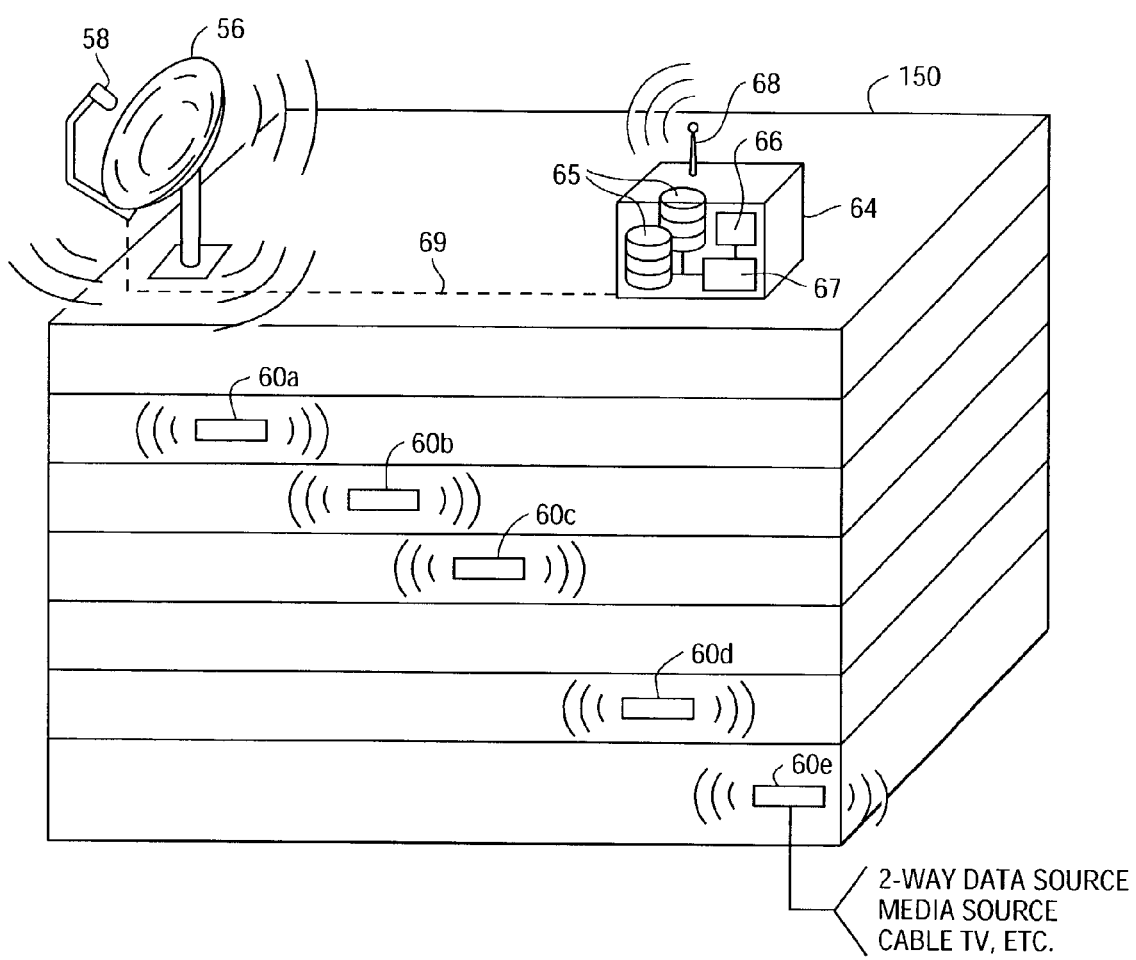
FIG. 7 shows the example of FIG. 4 optionally including a mass storage repository according to another embodiment of the present invention.

FIG. 7 illustrates the MDU example of FIG. 4, but with a specialized mass storage repository unit 64 installed on the rooftop of building 50. Repository unit 64 comprises a number of hard disk drives (HDDs) having a large total storage capacity (e.g., 10 terabytes) arranged as a RAID ("Redundant Array of Inexpensive Disks") 65 that functions as a media library apparatus. An 802.11x compliant wireless transceiver 66 is also included in repository unit 64 along with various electronics 67 coupled to both RAID 65 and transceiver 66. Electronics 67 may comprise a microcomputer including a processor (CPU), a ROM, a RAM, etc., to control the data read/write processing by the HDDs and to control the operation of transceiver 66. Electronics 67 may also include data compression/decompression circuitry for certain video and data applications. Still other embodiments may include encryption/decryption circuitry for receiving and sending transmissions in a secure manner. The RAID 65, transceiver 66, and electronics 67 are all housed in rugged, weather-resistant enclosure providing a suitable environment for the HDDs and the other circuitry.

Repository unit 64 may communicate via wireless transmission utilizing wireless transceiver 66 connected to a wireless antenna 68 mounted on top of unit 64. Alternatively, unit 64 may be coupled with signal unit 58 via a wire connection 69 (e.g., CAT-5) to utilize the transceiver in signal unit 58 for wireless communications.

In an alternative embodiment, repository unit 64 may be attached to the satellite antenna assembly to directly utilize the wireless transceiver installed in signal unit 58.

The purpose of RAID 65 is to store recorded media content (e.g., pay-per-view movies, videos, DVDs, special event programs, etc.). This content can be accumulated over time in a "trickle feed" manner from wireless transceiver 66, which may receive content from various sources such as satellite transmissions, media players, cable television, Internet, etc. Over time, repository unit 64 may store such large volumes of video programming. Anyone having the capability to access the wireless network can pay a fee to receive a particular show, movie, or viewable program stored in repository unit 64 on an on-demand basis.

Additionally, because of the interactive capabilities of the wireless network, the subscriber or user may communicate with unit 64 to provide commands such as "pause", "fast forward", "rewind", etc. Indeed, because of the large storage space available, live broadcast programs available through the WLAN described previously may be manipulated using such commands, thereby providing enhanced viewing flexibility to the user. Hard disk drive failures, which often plague in-home digital video recorders (DVRs), are not a problem because of the redundancy protection built into the RAID. Should a particular hard disk drive fail during operation, the remaining disk drive units simply take over until the repository unit can be serviced, at which time the failed drive can be replaced.

Repository unit 64 may also function as an archive storage apparatus for individuals within a local area to utilize as a storage facility for back-ups of personal data. For example, personal data such as photographs, important documents, books, articles, etc. may be transferred into a reserved space in the RAID. Various well-known security features may be built into repository unit 64 to maintain personal security of the backed-up data for each user.

Repository unit 64 may communicate via wireless transmission utilizing wireless transceiver 66 connected to a wireless antenna 68 mounted on top of unit 64. Alternatively, unit 64 may be coupled with signal unit 58 via a wire connection 69 (e.g., CAT-5) to utilize the transceiver in signal unit 58 for wireless communications.

It is also appreciated that repository unit 64 may be physically located somewhere other than on the rooftop of a building of MDUs. For instance, instead of being attached to or nearby a rooftop antenna assembly, repository unit may be located in a top floor space, in a basement, or in a ground level facility.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

It should be understood that although the present invention has been described in conjunction with specific embodiments, numerous modifications and alterations are well within the scope of the present invention. Accordingly, the specification and drawings are to be regarded in an illustrative rather than a restrictive sense.

I claim:

1. Antenna apparatus for mounting outdoors at a fixed location comprising:
   a dish positionable to receive satellite transmission signals from an orbiting satellite;
   at least one low-noise block converter (LNB) to receive the satellite transmission signals reflected off of the dish;
   a wireless communication transceiver mounted outdoors at the fixed location with the at least one LNB, the wireless communication transceiver operating as an 802.11x compliant device, the wireless communication transceiver being operable to transmit/receive digital data at a rate of 2 Mbps or greater to/from a plurality of devices located within a signal transmission range of the wireless communication transceiver.

2. The antenna apparatus of claim 1 wherein the digital data comprises video programs contained within the satellite transmission signals.

3. The antenna apparatus of claim 2 wherein the wireless communication transceiver receives control signals transmitted in a frequency range of about 40 MHz to about 1.2 GHz.

4. The antenna apparatus of claim 1 wherein the satellite transmission signals occupy a first frequency band and the wireless communication transceiver operates in a second frequency band distinct from the first frequency band.

5. The antenna apparatus of claim 4 wherein the second frequency band is the 5 GHz band.

6. The antenna apparatus of claim 1 further comprising a housing to enclose the at least one LNB and the wireless communication transceiver, and a feed horn protruding from the housing.

7. The antenna apparatus of claim 1 wherein the at least one LNB comprises first and second LNBs.

8. The antenna apparatus of claim 1 further comprising a wireless antenna coupled to the wireless communication transceiver.

9. The antenna apparatus of claim 1 wherein the wireless communication transceiver operates in accordance with IEEE 802.11a specification.

10. An antenna assembly for mounting outdoors at a fixed location comprising:
    a reflector dish;
    an arm;
    a unit attached at a distal end of the arm, the unit including:
       at least one low-noise block converter (LNB) to receive satellite signals reflected from the reflector dish; and
       a wireless communication transceiver operable to terrestrially transmit digital video programs to end users via a wireless network that includes at least one repeater, at least one end user being located a distance beyond a transmission range of the wireless communication transceiver.

11. The antenna assembly of claim 10 further comprising a support for mounting outdoors at the fixed location, the reflector dish being mounted to the support.

12. The antenna assembly of claim 11 wherein a proximate end of the arm is attached to the support.

13. The antenna assembly of claim 10 wherein a proximate end of the arm is attached to the reflector dish.

14. The antenna assembly of claim 10 wherein the unit further comprises:
    a housing to enclose the at least one LNB and the wireless communication transceiver; and
    a feed horn protruding from a side of the housing nearest the reflector dish.

15. The antenna assembly of claim 10 wherein the wireless communication transceiver operates to transmit and receive digital data to and from user devices located within a surrounding range.

16. The antenna assembly of claim 15 wherein the data includes video programs.

17. The antenna assembly of claim 10 wherein the satellite transmissions occupy a first frequency band and the wireless communication transceiver operates in a second frequency band distinct from the first frequency band.

18. The antenna assembly of claim 17 wherein the second frequency band is the 5 GHz band.

19. The antenna assembly of claim 10 wherein the at least one LNB comprises first and second LNBs.

20. The antenna assembly of claim 10 wherein the wireless communication transceiver operates as an 802.11x compliant device.

21. An antenna assembly for mounting outdoors at a fixed location, comprising:
    a reflector dish
    an arm;
    a unit attached at a distal end of the arm, the unit including:
       a first low-noise block converter (LNB) to receive satellite signals reflected from the reflector dish, the first LNB having a first polarization;
       a second low-noise block converter (LNB) to receive the satellite signals reflected from the reflector dish, the second LNB having a second polarization;
       a wireless communication transceiver that operates to transmit and receive digital data at a rate of 2 Mbps or greater to and from user devices located within a signal transmission range of the wireless communication transceiver.

22. The antenna assembly of claim 21 further comprising a support for mounting outdoors at the fixed location, the reflector dish being mounted to the support.

23. The antenna assembly of claim 21 wherein a proximate end of the arm is attached to the reflector dish.

24. The antenna assembly of claim 22 wherein a proximate end of the arm is attached to the support.

25. The antenna assembly of claim 21 wherein the unit further comprises:
    a housing to enclose the first and second LNBs and the wireless communication transceiver.

26. The antenna assembly of claim 25 further comprising a feed horn protruding from a side of the housing nearest the reflector dish.

27. The antenna assembly of claim 21 wherein the satellite transmissions occupy a first frequency band and the wireless communication transceiver operates in a second frequency band distinct from the first frequency band.

28. The antenna assembly of claim 27 wherein the second frequency band is the 5 GHz band.

29. The antenna assembly of claim 21 wherein the wireless communication transceiver operates as an 802.11x compliant device.

30. The antenna assembly of claim 21 wherein the wireless communication transceiver receives control signals transmitted in a frequency range of about 40 MHz to about 1.2 GHz.

31. An apparatus comprising:
a support for mounting outdoors at a fixed location;
a reflector dish attached to the support;
an arm
at least one low-noise block converter (LNB) attached at a distal end of the arm to receive satellite signals reflected from the reflector dish:
a unit configured for mounting outdoors, the unit including a wireless communication transceiver coupled to the at least one LNB, the wireless communication transceiver operating to terrestrially distribute network services that includes digital video programs to end users via a wireless network path that includes at least one wireless repeater, at feast one of the end users being located a distance beyond a transmission range of the wireless communication transceiver.

32. The apparatus of claim 31 wherein the network services comprise satellite broadcast services.

33. The apparatus of claim 31 wherein the network services further comprise interactive data services.

34. The apparatus of claim 31 wherein the unit further comprises a housing, the wireless communication transceiver being disposed within the housing.

35. The apparatus of claim 31 wherein the satellite signals occupy a first frequency band and the wireless communication transceiver operates in a second frequency band distinct from the first frequency band.

36. The apparatus of claim 35 wherein the second frequency band is the 5 GHz band.

37. The apparatus of claim 31 wherein the at least one LNB comprises first and second LNBs.

38. The apparatus of claim 31 wherein the wireless communication transceiver operates as an 802.11x compliant device.

39. An apparatus for mounting outdoors at a fixed location comprising:
a unit that includes:
a reflector dish;
an arm;
at least one low-noise block converter (LNB) attached at a distal end of the arm to receive satellite signals reflected from the reflector dish;
a wireless communication transceiver that operates as an 802.11x compliant repeater to distribute digital data contained within the satellite signals to users located in a surrounding range; and
a solar cell panel coupled to provide power to the wireless communication transceiver.

40. The apparatus of claim 39 wherein the satellite signals include network services which comprise interactive data services.

41. The apparatus of claim 39 further comprising a housing, the at least one LNB and the wireless communication transceiver being disposed within the housing.

42. The apparatus of claim 39 wherein the satellite signals occupy a first frequency band and the wireless communication transceiver operates in a second frequency band distinct from the first frequency band.

43. The apparatus of claim 42 wherein the second frequency band is the 5 GHz band.

44. The apparatus of claim 39 further comprising a support, the reflector dish and solar cell panel being mounted to the support.

45. The apparatus of claim 39 wherein the wireless communication transceiver operates according to IEEE 802.11a specification.

46. An apparatus comprising:
an antenna unit that includes:
a reflector dish;
a low-noise block converter (LNB) to receive satellite transmission signals reflected from the reflector dish;
a wireless transceiver mounted with the at least one LNB, the wireless transceiver operating as an 802.11x compliant device; and
a solar cell panel coupled to provide power to the wireless communication transceiver, the wireless transceiver being operable to distribute digital data contained within the satellite signals to end users located in a signal transmission range of the wireless communication transceiver.

47. The apparatus of claim 46 wherein the satellite signals occupy a first frequency band and the wireless transceiver operates in a second frequency band distinct from the first frequency band.

48. The apparatus of claim 46 wherein the wireless transceiver is operable to distribute the satellite signals satellite signals via a terrestrial wireless network path that includes at least one wireless repeater, at least one of the end users being located a distance beyond a transmission range of the wireless transceiver.

* * * * *